Patented Feb. 2, 1943

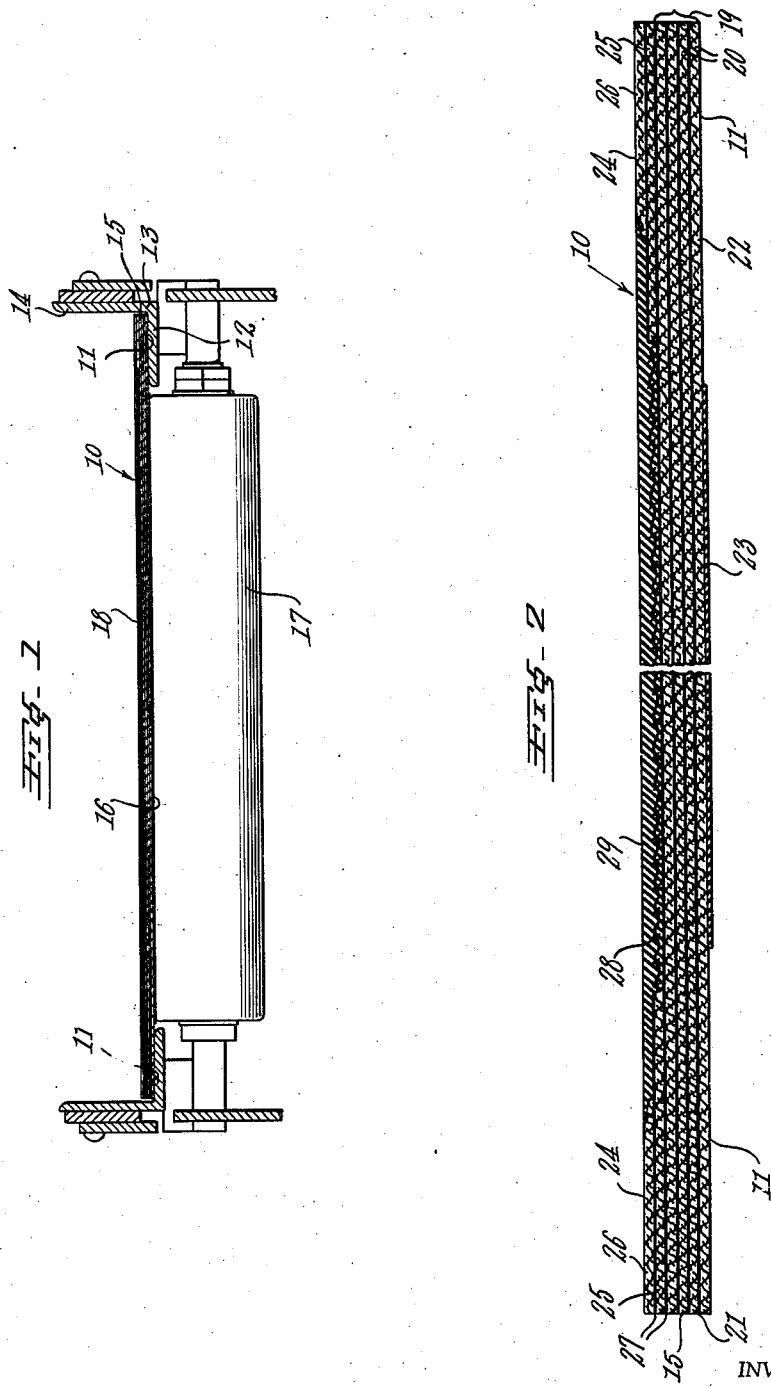

2,309,928

UNITED STATES PATENT OFFICE 2,309,928

CONVEYER BELT

Thomas A. Bennett, New York, N. Y., assignor to United States Rubber Company, New York, N. Y., a corporation of New Jersey Application October 19, 1940, Serial No. 361,866

4 Claims. (Cl. 198—193)

This invention relates to an improved conveyer belt of the flat type, and particularly to a construction adapted to increase the wear life of the longitudinal top and bottom margins and the side edges of the belt, and to provide a stronger union between the rubber and fabric layers.

In the type of conveyer belt referred to herein, including the present invention and prior constructions, the carcass of the belt is made of layers of fabric bonded together with rubber in accordance with the usual practice. The top surface of the belt is provided with a rubber cover to protect the carcass from being cut and worn by the load and the bottom surface of the belt is provided with a rubber cover to provide greater traction between the belt and the driving pulley. The load is carried by the top surface of the top run of the belt, and the longitudinal bottom margins on each side of the top run are supported by spaced metal side plates and the portion of the top run between the side plates is supported at intervals by spaced rollers extending between the plates. The belt is confined at its side edges by vertical metal plates. As the belt is driven, the bottom surface of its longitudinal margins are caused to slide along the side plates and its side edges are caused at times to slide in contact with vertical plates.

In the prior constructions it has been proposed to reduce the friction between the surfaces of the belt and the surfaces they engage in sliding contact. These proposals included making the top and bottom surfaces of the longitudinal margins of bare fabric. The term "bare" as used herein means that the surface of the fabric is uncoated or does not have a heavier coating than a thin friction coating of rubber which impregnates the fabric without appreciably covering it. The bare fabric was used on the margins because the coefficient of friction between it and the surfaces with which it formed sliding contact was lower than if such surfaces were made of rubber. Consequently the protective rubber covering extended only between the inner edges of such bare margins.

In some of the prior constructions, the bare margins were constructed of bare strips of fabric bonded to the top and bottom layers of fabric in the carcass and the rubber coverings filled the depression between the strips. In other belts, strips of fabric were placed along the margins between the bottom layer of carcass fabric and the next adjacent layer. The top layer of fabric in the carcass was covered with rubber from side edge to side edge and the bottom layer was covered with rubber only in the depression formed between the longitudinal strips.

When the longitudinal strips of fabric were bonded to the bottom surface of the bottom layer of fabric in the carcass, the strips were the first of the layers to wear through, and the narrow inner edges of the strips remained on the carcass. The weft threads in such edges being short and being anchored at their ends only by adhesion, they easily pulled out and the edges readily unravelled. The loose warp threads and/or portions of the entire edges are liable to break loose from the carcass, and become caught on the stationary parts of the conveyer system and tear the rubber covering from the carcass.

Where the longitudinal strips of fabric were inserted between the layers of carcass fabric, the bottom layer was bent or curved downwardly where it overlapped the inner edges of the strips. The downward curvature of the bottom layer causes it to buckle as it goes around the drive or other pulleys and the buckling action breaks down the fabric and causes it to separate from the adjacent layer. Furthermore the separation of the layers, when one of the layers is worn through produces a very ragged appearance, and such initial separation progressively increases towards the center of the belt.

In accordance with the present construction embodying this invention the surfaces of the top and bottom margins adapted to be subjected to sliding friction are made of bare fabric having a hard duck weave, which reduces the friction as compared to rubber and softer ducks previously used in conveyer belt constructions.

The term "hard duck" as used herein specifies a fabric having tightly twisted warp and weft threads and having its weft threads driven up tight in the loom so as to give a hard surface.

Another advantage is obtained by eliminating the longitudinal marginal strips of fabric on the bottom surface, or interposed between the bottom layer of carcass fabric and the next adjacent layer of fabric. This is done by extending the bottom layer of duck in the carcass continuously and straight across the belt, and applying the bottom rubber covering to only that portion of the bottom surface of the bottom layer of duck in the carcass extending between each of the longitudinal margins which are left bare. In this construction there are no discontinuous layers of fabric or joints at their edges extending along the longitudinal margin of the belt on or near the bottom surface, which may separate due to wear and flexing, and when the longitudinal margins of the bottom layer of duck are worn through, the next adjacent layer of hard duck in the carcass comes in contact with the supporting side plates, and the belt may be continued in operation. Due to the fact that the bottom layer of duck extends continuously and straight across the belt from side edge to side edge, and is not bent downwardly or offset at the margins, a better union is formed between it and the adjacent layer, and the duck is not caused to buckle as it passes around the pulley. Consequently the disintegration of the duck and its separation from its adjacent layer is avoided. Furthermore when the margins of the bottom layer are worn through the remaining portion of the weft threads are straight and continuous, which reduces the tendency of the warp threads to unravel from the weft threads and break loose.

It is also contemplated that one or more strips of hard duck will be applied to the longitudinal top margin of the belt for the purpose of stiffening the edges and thereby decrease the tendency of the side edges of the belt from pulling away from the vertical plates between the rollers. The depression formed between the top marginal strips is filled with the usual rubber cover.

The foregoing and other objects and advantages of this invention will be more clearly understood by referring to the following description and the accompanying drawing, in which:

Fig. 1 is a cross sectional view of the conveyer belt embodying this invention and a portion of the conveyer system, illustrating the relation between the belt and the system; and Fig. 2 is an enlarged cross sectional view of the belt having a longitudinal section removed from its central portion.

As shown in Fig. 1 the belt 10, embodying this invention, is supported at its longitudinal bottom margins 11 by side plates 12 forming the lower leg of an angle 13. The belt is confined laterally between the vertical plates 14 forming the vertical leg of the angle 13, and coming in contact at times with the side edges 15 of the belt. The intermediate portion 16 of the bottom surface of the belt is supported by spaced rollers 17, only one of which is shown for convenience. The load is carried by the top surface 18 of the belt and the belt is driven by a pulley, not shown. When the belt is in motion, it is subjected to sliding friction between the longitudinal bottom margins 11 and side plates 12 and between the side edges 15 and the vertical plates 14. Consequently it is desirable to reduce the coefficient of friction between the sliding surfaces in these areas. Since these belts carry relatively heavy loads, it is also desirable to reinforce the marginal edges to prevent them from tearing in this area where they are subjected to the greatest strain, which may be caused by frictional drag between the longitudinal margins 11, the edges 15 and the supporting and confining plates 12 and 14.

For the purpose of accomplishing the foregoing objects, the belt is constructed as shown in cross section in Fig. 2. The carcass 19 of the belt is made up of a plurality of layers 20 of hard duck having thin layers 21 of rubber interposed therebetween and vulcanized thereto so as to unite said plies into a unitary structure. The layers 20 are bonded together in a press under heat and pressure while they extend across the belt in a straight line from side edge to side edge. The layers 20 of duck are friction- coated with rubber, as usual, prior to being plied up. The bottom layer 22 of duck is provided with a thin rubber covering 23, which for example may be about $\frac{1}{32}''$ in thickness. The rubber covering 23 extends between the inner edges of the longitudinal bare margins 11 of the bottom surface of the belt which come in contact with the supporting plates 12. This layer of rubber is provided to increase the friction between the driving pulley and the belt and also to protect the bottom surface of the belt from impact against the rolls 17 due to the load.

The longitudinal top margins 24 of the belt 10 are provided with longitudinal strips 25 and 26 of hard duck which are secured to each other and to the top layer of duck in the carcass by thin layers 27 of rubber interposed therebetween and vulcanized to the adjacent surfaces of such parts.

The depression formed between the longitudinal strips 25 and 26 at the opposite margins of the belt is filled in by a breaker strip 28 adhered to the top surface of the top layer of duck by a vulcanized bond of rubber, and the remainder of the depression is filled by a rubber covering layer 29 which is vulcanized to the breaker strip 28. If desired, the breaker strip 28 may be extended from side edge to side edge of the belt between the strip of duck 25 and the layer 20 to increase the depth of the depression occupied by the rubber cover 29 and thereby increase the thickness of the rubber 29. The longitudinal strips of fabric 25 are wider than the strips 26 which form a stepped construction. The rubber covering 29 is extended over the inner edges of the steps. This construction is used in order to form a better anchorage for the inner edges of the duck strips 25 and 26. The longitudinal strip 26 is made of hard duck which reduces the friction between it and the load carried thereby when that portion of the load drags against the vertical plates 14. If desired the layers of fabric other than the two bottom layers 20 and the top strips 26 may be made of a suitable fabric other than hard duck, but it is preferred to make all of the fabric in the belt of hard duck, excepting the breaker strip 28 so that as much hard duck will be on the side edges 15 as is possible. The open weave breaker strip 28 is used to reinforce the top rubber cover 29, and if it is extended to the side edges to increase the thickness of the cover it does not substantially affect the friction resistance at the side edges 15. Since all of the surfaces, including the top marginal surface 24, side edges 15 (excepting in some cases when the breaker strip extends to the side edges), and bottom longitudinal margins 11 are made of hard duck, the frictional drag is materially reduced as compared to the case where softer ducks or rubber covering are used.

While the details of this invention have been described, it will be understood that changes may be made therein without departing from the spirit of this invention and the scope of the appended claims.

Having thus described my invention, what I claim and desire to protect by Letters Patent is:

1. A flat conveyer belt comprising a carcass composed of a plurality of layers of duck bonded together with vulcanized rubber therebetween, the bottom layer of duck extending continuously and straight across said belt in a transverse vertical section, and said bottom layer having longitudinal bare bottom marginal surfaces and a rubber cover extending between said margins and bonded to said bottom layer of duck.

2. A flat conveyer belt comprising a carcass composed of a plurality of layers of duck bonded together with vulcanized rubber therebetween, the bottom layer of duck extending continuously and straight across said belt in a transverse vertical section, said bottom layer having longitudinal bare bottom marginal surfaces and a relatively thin rubber cover extending between said margins and bonded to said bottom layer of duck, said belt having a top surface composed of marginal strips of duck bonded to said carcass, a relatively thick rubber cover extending between said marginal strips and bonded to said carcass, and cut side edges, said edges being bare excepting for the rubber vulcanized between said strips and layers of fabric.

3. A flat conveyer belt comprising a carcass composed of a plurality of layers of hard duck bonded together with rubber vulcanized therebetween, all of said layers of duck extending continuously and straight across said belt in a transverse vertical section, the bottom of said layers having longitudinal bare bottom marginal surfaces and a rubber cover extending between said margins and bonded to said bottom layer of duck, said belt having a top surface composed of marginal strips of duck bonded to said carcass, a rubber cover extending between said marginal strips and bonded to said carcass, and square cut side edges, said edges being bare excepting the rubber vulcanized between the strips and layers of fabric in said carcass.

4. A flat conveyer belt comprising a carcass composed of a plurality of layers of hard duck bonded together with rubber vulcanized therebetween, all of said layers of duck extending continuously and straight across said belt in a transverse vertical section, the bottom of said layers having longitudinal bare bottom marginal surfaces and a rubber cover extending between the inner edges of said marginal surfaces and bonded to said bottom layer of duck, an inner and an outer longitudinal strip of hard duck bonded to each of the top longitudinal margins of said carcass to reinforce and stiffen said margins, the inner edges of said strips being stepped back from one another, and a rubber cover extending just over and between the inner edges of said strips.

THOMAS A. BENNETT.